United States Patent [19]

Onodera

[11] Patent Number: 5,432,891
[45] Date of Patent: Jul. 11, 1995

[54] IMAGE PROCESSING METHOD AND APPARATUS

[75] Inventor: Ken Onodera, Yokohama, Japan

[73] Assignee: Canon Kabushiki Kaisha, Tokyo, Japan

[21] Appl. No.: 324,459

[22] Filed: Oct. 17, 1994

Related U.S. Application Data

[63] Continuation of Ser. No. 869,395, Apr. 16, 1992, abandoned.

[30] Foreign Application Priority Data

Apr. 23, 1991 [JP] Japan .................................. 3-092310

[51] Int. Cl.⁶ ............................................. G06F 15/00
[52] U.S. Cl. ........................................ 395/114; 395/115
[58] Field of Search .............. 395/112, 113, 114, 115, 395/116, 164, 110; 358/262.1, 426; 382/56; 346/154

[56] References Cited

U.S. PATENT DOCUMENTS

| 4,068,224 | 1/1978 | Bochtle et al. | 340/324 |
| 4,903,317 | 2/1990 | Nishihara et al. | 382/56 |
| 5,068,805 | 11/1991 | Tsuzuki | 395/164 |

FOREIGN PATENT DOCUMENTS 420575  4/1991  European Pat. Off. .... G06K 15/02

Primary Examiner—Arthur G. Evans
Attorney, Agent, or Firm—Fitzpatrick, Cella, Harper & Scinto

[57] ABSTRACT

A reduced image is enlarged, difference data representing the difference between the enlarged image and an original image is obtained, and the difference data is compressed. Image data is restored by enlarging the reduced image, and expanding the difference data. When compression cannot be performed to a data size equal to or smaller than a predetermined data size, compressed difference data is not stored.

8 Claims, 10 Drawing Sheets

FIG. 2A

BEFORE REDUCTION

AFTER REDUCTION

BEFORE ENLARGEMENT $d = 0.45 * bit0 + 0.20 * bit1$
$\quad + 0.20 * bit4 + 0.15 * bit5$
$= 0.80$
$= ON$

AFTER ENLARGEMENT

IMAGE PROCESSING METHOD AND APPARATUS

This application is a continuation of application Ser. No. 07/869,395, filed Apr. 16, 1992, now abandoned.

BACKGROUND OF THE INVENTION

1. Field of the Invention

The present invention elates to an image processing method and apparatus utilizing reduction/enlargement and compression/expansion of an image, which method and apparatus can be applied to an output apparatus such as a printer.

2. Related Background Art

A conventional image processing apparatus for outputting and printing an image must be prepared with a bit map memory having a resolution corresponding to an output resolution of the image. On the other hand, along with development of recent printing apparatuses, a high-resolution output is required, and the capacity of a bit map memory inevitably tends to be increased. As a result, the ratio of memory cost to the cost of the other hardware in the overall image processing apparatus is increased.

In order to reduce the required memory capacity, in general, the following techniques are employed: (1) a small-capacity memory is used in place of a bit map memory corresponding to the entire region of one printing sheet, and an image is printed in units of windows (bands), (2) a bit map is compressed by a compression technique, and (3) a bit map holds data at a low resolution, and data is enlarged while being smoothed in an output stage.

However, the prior art suffers from the following problems.

(1) When an image is printed in units of windows (bands), for example, when a complex figure such as graphic data is to be printed, a long period of time is required to develop the figure into windows, and window development cannot catch up with the output speed of a printing apparatus. As a result, a printing error may occur.

(2) When a bit map is compressed, there is no satisfactory compression method for performing fixed-length reversible compression. As a variable-length compression method, entropy compression methods such as the MMR method and the like are known. However, since variable-length codes are used, data cannot be directly corrected. In addition, compression efficiency is decreased when a complex figure is to be compressed.

(3) Image smoothing in an output stage inevitably causes deterioration of image quality as compared to a case wherein a high-resolution bit map is used, although this depends on the particular smoothing method.

SUMMARY OF THE INVENTION

The present invention has been made in consideration of the above situation, and has as one aspect an image processing method and apparatus, which comprises means for reducing image data, means for enlarging image data, means for compressing image data, means for expanding compressed image data, and means for storing image data, and wherein image data is reduced and stored, difference data between original data and image data enlarged after reduction is obtained, the difference data is compressed and is separately stored, and when stored data is output, image data is restored based on data obtained by enlarging the reduced image data, and data obtained by expanding the compressed difference data, so that a high-resolution bit map memory can be compressed and stored without causing image quality deterioration.

It is another aspect of the present invention to provide an image processing method or apparatus, wherein image data is reduced, a difference between original image data and image data enlarged after reduction is calculated, the difference data is compressed, and image data can be restored based on data obtained by enlarging the reduced image data, and data obtained by expanding the compressed difference data.

The present invention has been made in consideration of the prior art, and has as still another aspect to provide an image processing method and apparatus, which can achieve a high-speed output operation without increasing the capacity of a storage medium for bit map development.

It is another aspect of the present invention to provide an image processing method for bit-map developing data received from an external apparatus, and outputting an image onto a recording medium, comprising: the reception step of receiving the data; the reduction storage step of converting the data into image data, and storing the image data in a reduced scale in a first storage medium having a capacity smaller than a capacity of image data which can be output to the recording medium; the compressed difference data storage step of obtaining an enlarged image by enlarging the reduced image data, obtaining difference data between the image data and the enlarged image, compressing the difference data, and storing the compressed difference data in a second storage medium; the restoration step of reading out the reduced image data and the compressed difference data from the first and second storage media by a predetermined amount, restoring original image data by enlarging the readout reduced image data and expanding the readout compressed difference data, and outputting the restored image data to one of a plurality of buffers; the output step of outputting the predetermined amount of restored image data from one of the plurality of buffers; and the control step of controlling the restoration step to restore another predetermined amount of image data from the remaining amount of image data to another buffer different from the one of the plurality of buffers during an output operation of the predetermined amount of restored image data in the output step.

It is still another aspect of the present invention to provide an image processing apparatus for bit-map developing data received from an external apparatus, and outputting an image onto a recording medium, comprising: reception means for receiving the data; first storage means for storing image data, an amount of which is smaller than an amount of image data which can be output onto the recording medium; reduction means for converting the data into image data, and outputting the image data to the first storage means in a reduced scale; enlargement means for enlarging the reduced image data, and outputting an enlarged image; difference compression means for obtaining difference data between the image data and the enlarged image, and compressing the difference data; second storage means for storing the compressed difference data; restoration means for reading out the reduced image data and the compressed difference data from the first and second storage means by a predetermined amount, and restoring original image data by enlarging the readout reduced image data and expanding the readout compressed difference data; a plurality of buffer means for storing the original image data restored by the restoration means; output means for outputting the original image data from one of the plurality of buffer means; and control means for controlling the restoration means to restore another predetermined amount of image data from the remaining amount of image data to another buffer means different from the one of the plurality of buffer means during an output operation of the original image data by the output means.

In consideration of the above situation, it is still another aspect of the present invention to provide an image processing method and apparatus, wherein in an operation for input data, input data is converted into image data, the image data is reduced and stored, a difference between an enlarged image obtained by enlarging the reduced image data and original image data, and the difference data is compressed and stored, while in an image data output operation, original image data is restored by enlarging the stored reduced image data by a predetermined amount and expanding the compressed difference data by a predetermined amount, the restored image data is output to one of a plurality of buffers to output an image while another predetermined amount of image data is restored and output to another buffer.

These and other objects, features and advantages of the present invention will be more fully appreciated from the following detailed description of the preferred embodiments, taken in conjunction with the accompanying drawings, in which like elements are indicated by like reference characters throughout.

BRIEF DESCRIPTION OF THE DRAWINGS

FIGS. 2A and 2B are views for explaining reduction processing by an image reduction circuit 6;

FIGS. 3A and 3B are views for explaining enlargement processing by an image enlargement circuit 7;

DETAILED DESCRIPTION OF THE PREFERRED EMBODIMENTS

A preferred embodiment of the present invention will be described in detail below with reference to the accompanying drawings.

[Summary of Apparatus Arrangement (FIG. 1)]

Figure 1:
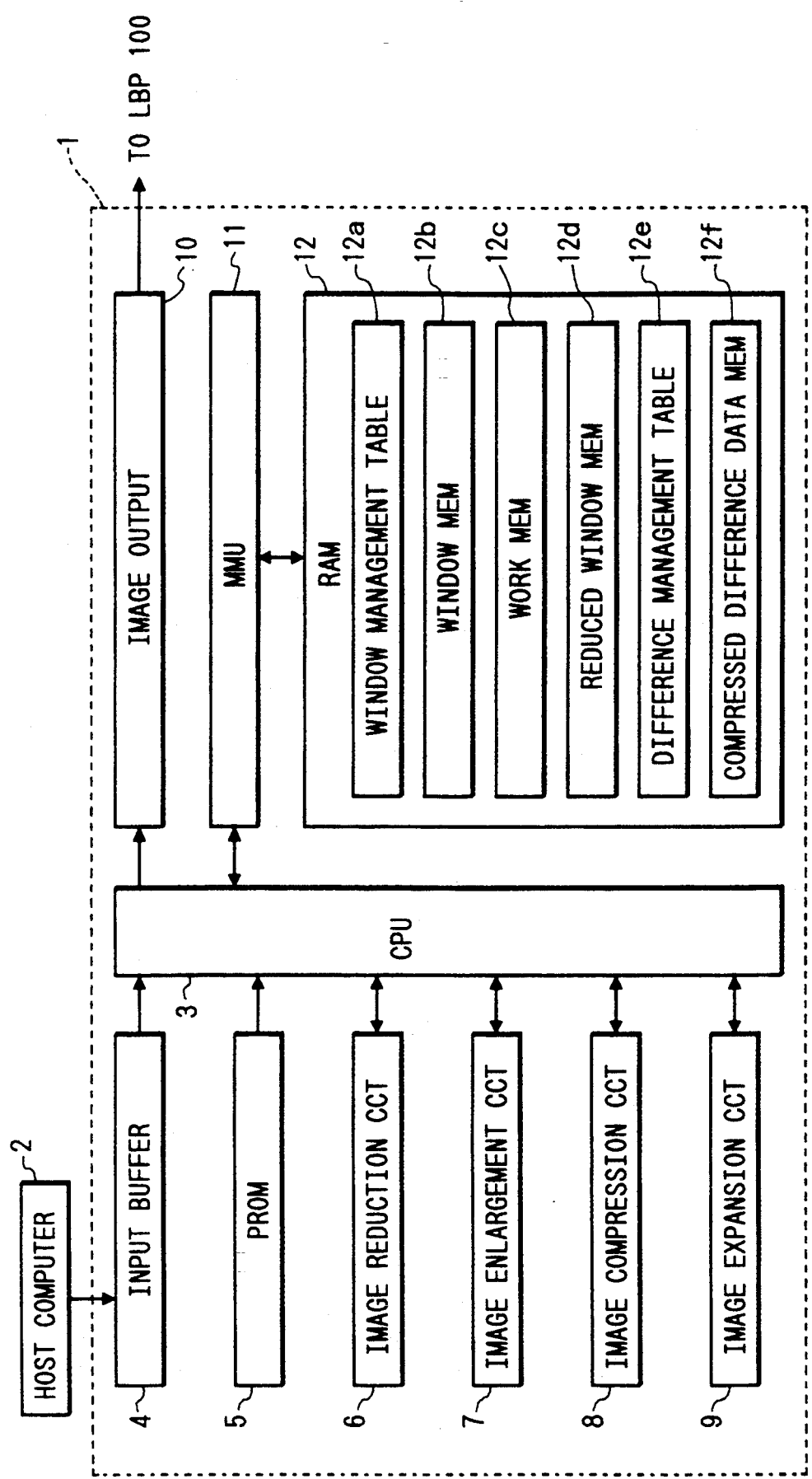
FIG. 1 is a block diagram showing an arrangement of a printing controller assembled in a laser printer as a typical embodiment of the present invention.

FIG. 1 is a block diagram showing an arrangement of a printing controller assembled in a laser printer as a typical embodiment of the present invention, In this laser printer, image data for one recording sheet is divided into a plurality of small units (to be referred to as windows hereinafter), and a memory for storing a plurality of (two in this embodiment) window data is arranged in place of using a bit map memory for developing image data for one recording sheet, so that image data development and data transfer to the laser printer can be executed in units of windows.

In FIG. 1, a printing controller 1 is connected to an external host computer 2 for supplying printing data to the laser printer, and controlling a printing operation. The printing controller 1 includes a CPU 3 for controlling the printing controller 1 and the overall laser printer (to be described later) according to control procedures described below, an input buffer 4 for temporarily storing reception data such as a drawing instruction, a sheet delivery instruction, and the like from the host computer, a PROM 5 for storing programs and the like for executing a series of control procedures described below, an image reduction circuit 6 for reducing image data, an image enlargement circuit 7 for enlarging image data, an image compression circuit 8 for performing variable-length compression of image data by an MMR compression method, an image expansion circuit 9 for expanding image data compressed by the image compression circuit 8 to restore original image data, an image output unit 10 for outputting image data developed on a RAM 12 (to be described later) to the laser beam printer in response to an image output instruction from the CPU 3, an MMU (memory management unit) 11 for performing memory management of the RAM 12 (to be described below) when the CPU 3 accesses the RAM 12, and the RAM 12 used as a work memory, an image memory, and the like by the CPU 3 upon execution of a program. The RAM 12 performs data I/O operations with the CPU 3 through the MMU 11.

Figure 4A:
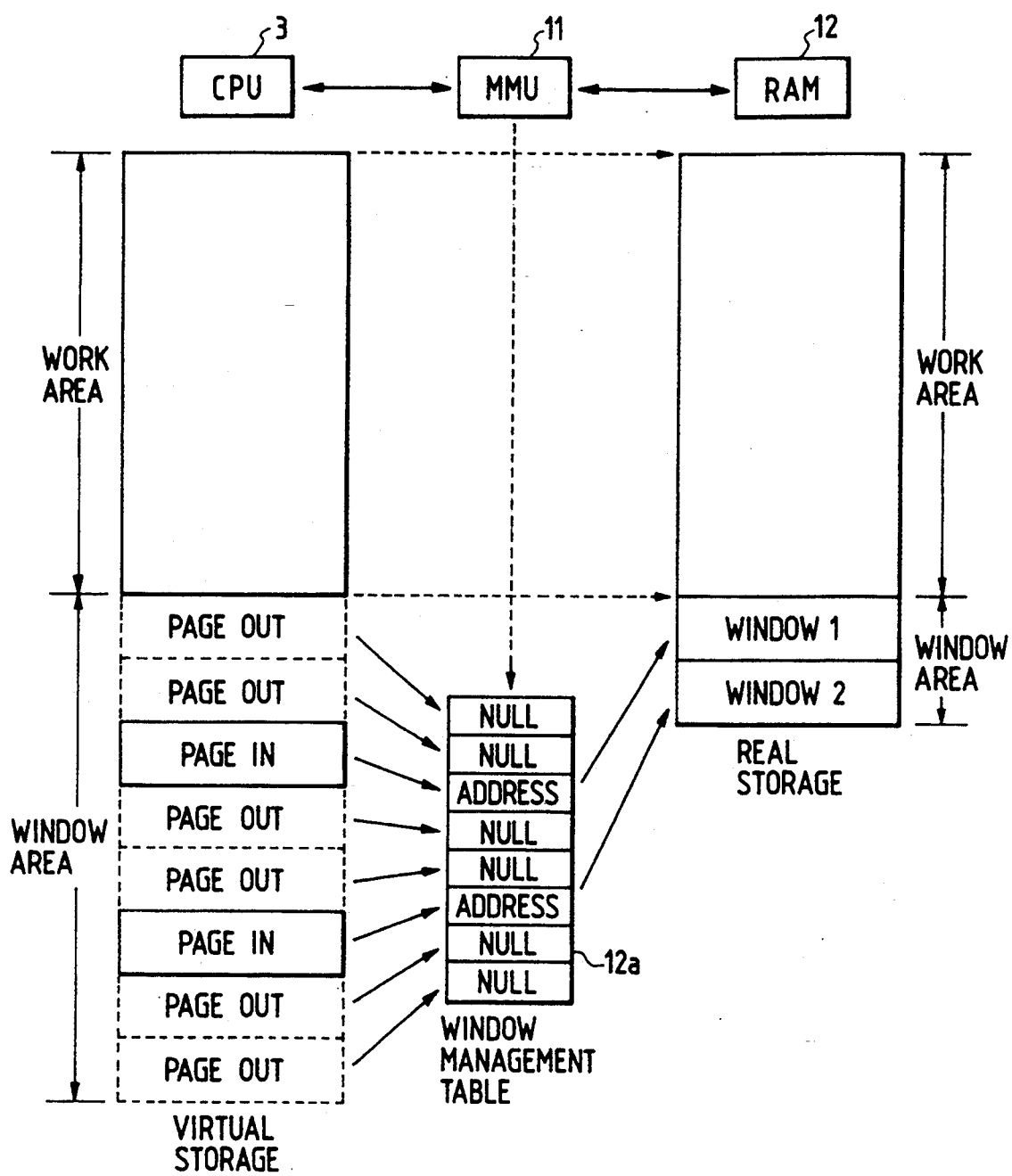
FIGS. 4A and 4B are views for explaining a memory management function of an MMU 12.

The RAM 12 is assigned with a window management table 12a used by the MMU 11 for managing a window area in virtual storage, a plurality of window memories 12b used as windows on the virtual storage, a work memory 12c used in page-out/page-in processing of the window memories, a reduced window memory 12d for storing data reduced by the image reduction circuit 6 upon execution of the page-out processing of the window memory, a compressed difference data memory 12f for storing compressed difference data which is used in an enlargement/restoration mode, and compressed by the image compression circuit 8, and a difference management table 12e used for managing variable-length compressed data by the memory 12f. In an image output mode, the window memories 12b and the work memory 12c are alternately used as window and work areas. The window memory 12b has areas (windows 1 and 2) capable of storing two windows, as shown in FIG. 4A (to be described later).

The page-out processing means processing for reducing window data in the window memory 12b, storing the reduced data in the reduced window memory 12d, enlarging the reduced data, generating difference data based on the enlarged data and original window data, compressing the difference data, and storing the compressed difference data in the compressed difference data memory 12f. The page-in processing means processing for enlarging reduced data, and correcting the enlarged data on the basis of data restored by expanding the compressed difference data. The page-out and page-in processing operations will be described in detail later.

[Detailed Description of Apparatus's Principal Parts (FIGS. 2 to 5)]

Figures 2A, 2B:
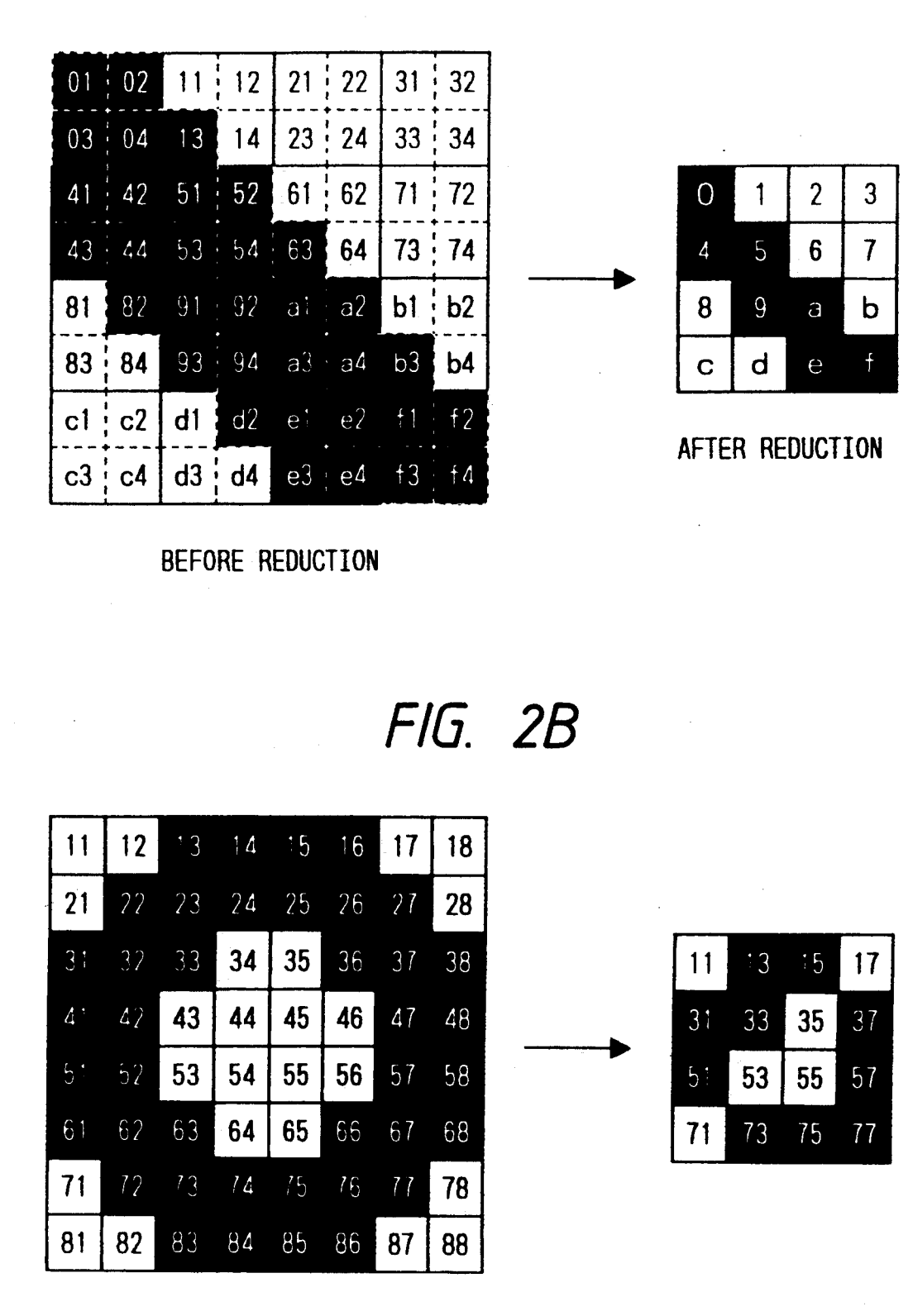

As shown in FIG. 2A, the image reduction circuit 6 reduces a resolution to $\frac{1}{2}$ ($\frac{1}{2}$ in both the vertical and horizontal directions; $\frac{1}{4}$ in the total number of pixels) by using an averaging method. In this method, a total of 4 bits, i.e., 2×2 bits in the vertical and horizontal directions, are handled as a unit, and an ON/OFF state of a reduced bit value for converting a corresponding unit into 1 bit is determined depending on whether or not two or more bits of the 4 bits are ON (i.e., have values of "1"). Alternatively, as shown in FIG. 2B, the resolution may be reduced to ½ by a method of thinning out every other bit in both the vertical and horizontal directions.

As shown in FIG. 3A, the image enlargement circuit 7 enlarges resolution twice (twice in both the vertical and horizontal direction; four times in the total number of pixels) by using a weighted mean interpolation method. In this method, a mean value of original pixels (ON=1, OFF=0) multiplied with normalized weighting coefficients inversely proportional to the geometrical distances from pixel positions on an image in a ×2 enlarged scale is calculated by the following equation (1), the mean value is determined as a pixel value at that position, and an ON/OFF state of a pixel of interest is determined depending on whether or not the pixel value is equal to or higher than 0.5:

$$d = 0.45 \times bit0 + 0.20 \times bit1 + 0.20 \times bit4 + 0.15 \times bit5 \quad (1)$$

where bit0 is the value of a pixel, separated from a pixel of interest by the smallest distance, from among the pixels before enlargement (i.e., not yet enlarged) adjacent to the pixel of interest, bit1 and bit4 are the values of pixels separated from the pixel of interest by a medium distance, from among the pixels before enlargement adjacent to the pixel of interest, and bit5 is the value of a pixel, separated from the pixel of interest by the largest distance, from among the pixels before enlargement adjacent to the pixel of interest.

Figure 3B:
Figure 3B:
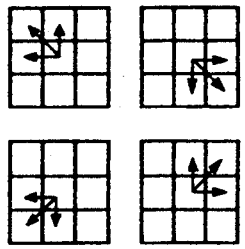
Figure 3B:

Furthermore, as shown in FIG. 3B, the enlargement circuit enlarges one bit twice in both the vertical and horizontal directions, i.e., to 4 bits, and simultaneously performs smoothing processing for, when all the 3 bits in an oblique direction, from among the eight adjacent bits, are ON or OFF, matching one bit in the direction with the 3 bits in the oblique direction, thereby enlarging the resolution twice.

In FIG. 4A, during data I/O operations between the CPU 3 and the RAM 12, the MMU 11 performs memory management using the window management table 12a stored in the RAM 12 as follows. In this embodiment, the CPU 3 performs addressing using a left virtual storage (VM) shown in FIG. 4A. At this time, the CPU 3 directly accesses the work area of the RAM 12 through the MMU 11 without any address conversion. More specifically, as for the work area, the addresses of the virtual storage are the same as those of a real storage of the RAM 120 In contrast to this, when the CPU 3 accesses the window area of the RAM 12, it confirms a page state using the window management table 12a. When the CPU 3 determines that a desired window is set in a page-in state in the RAM 12 (i.e., when the real address is set in the table 12a), the CPU 3 accesses the real memory through the window management table 12a. When the CPU 3 determines that a desired window is not set in a page-in state in the RAM 12 (i.e., a value "NULL" is set in the table 12a), the CPU 3 sets one of window pages, set in a page-in state, in a page out state, and sets the accessed new window in a page in state, thereby accessing the real memory through the window management table.

Figure 4B:
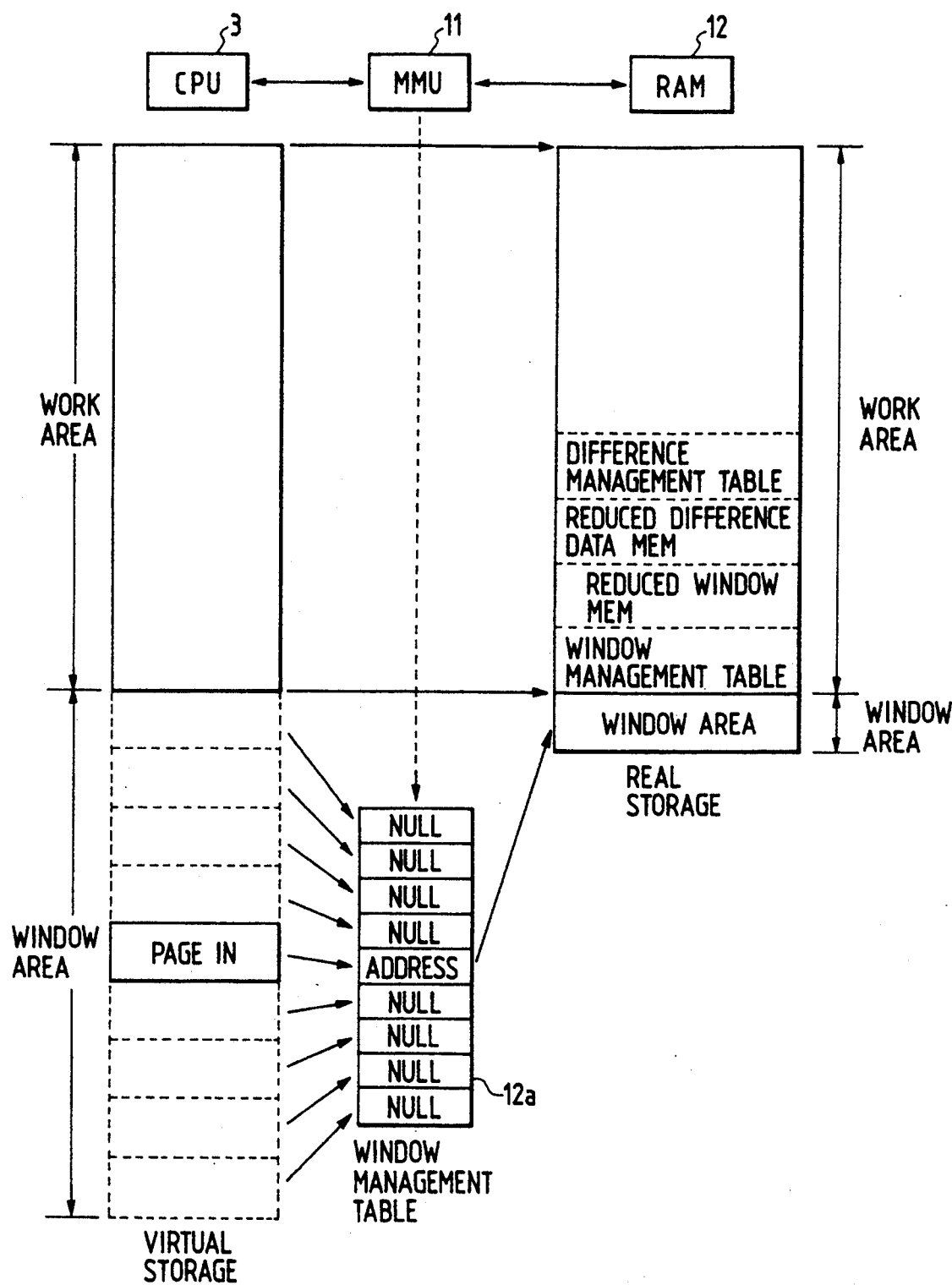

Note that as shown in FIG. 4B, the work area includes the memory 12d for storing data reduced by the image reduction circuit 6 when the page-out processing of the window memory is executed, the memory 12f for storing difference data used in an enlargement/restoration mode and compressed by the compression circuit 8, and the management table 12e used for managing variable-length compressed data by the memory 12f.

Figure 5:
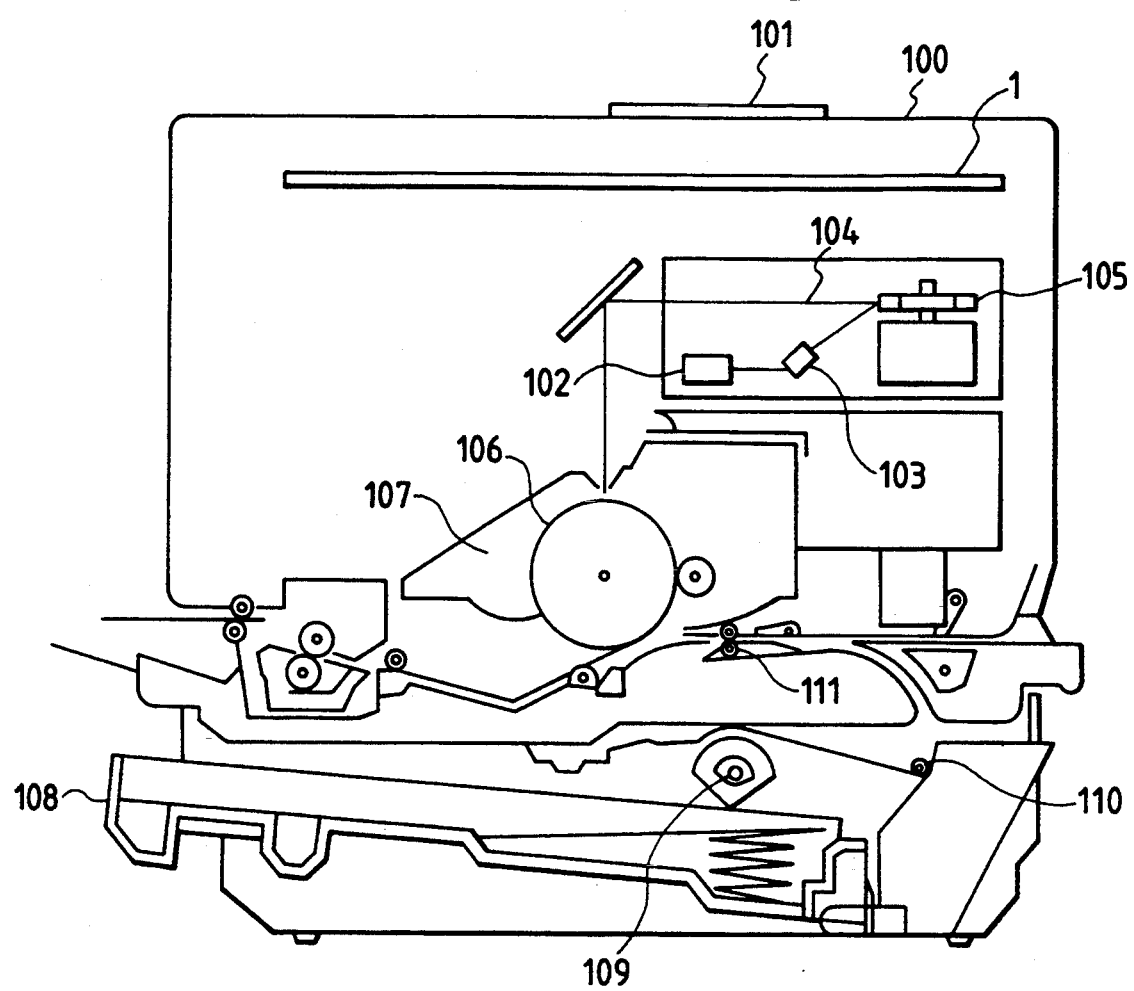
FIG. 5 is a sectional view showing the internal structure of laser beam printer 100.

FIG. 5 is a sectional view showing the internal structure of a laser beam printer (to be referred to as an LBP hereinafter), in which character patterns, standard formats (form data), and the like can be registered from a data source (not shown), and which outputs image data output from the image output unit 10 onto a recording sheet. In FIG. 5, an LBP main body 100 receives and stores character information (character codes), form information, or macro instructions supplied from the host computer 2 connected thereto, generates corresponding character patterns or form patterns according to the stored information, and forms an image on a recording sheet as a recording medium. An operation panel 101 includes operation switches, LEDs, an LCD display, and the like. The printing controller 1 controls the overall LBP 100, and analyzes character information and the like supplied from an external apparatus. The printing controller 1 converts, e.g., character information into a video signal of a corresponding character pattern, and outputs the video signal to a laser driver 102.

The laser driver 102 is a circuit for driving a semiconductor laser 103, and switches an ON/OFF state of a laser beam 104 emitted from the semiconductor laser 103 according to an input video signal. The laser beam 104 is deflected in the right-and-left direction by a rotary polygonal mirror 105, and scans on an electrostatic drum 106. Thus, an electrostatic latent image of a character pattern is formed on the electrostatic drum 106. The latent image is developed by a developing unit 107 arranged around the electrostatic drum 106, and the developed image is transferred onto a recording sheet. As the recording sheet, cut sheets are used. Cut recording sheets are stored in a paper cassette 108 attached to the LBP 100. Each sheet is picked up into the LBP by a paper feed roller 109 and convey rollers 110 and 111, and is fed to the electrostatic drum 106.

[Printing Processing (FIGS. 6 to 8)]

The printing processing executed by the LBP 100 including the printing controller 1 with the above-mentioned arrangement will be described below with reference to the flow charts shown in FIGS. 6 to 8.

Figure 6:
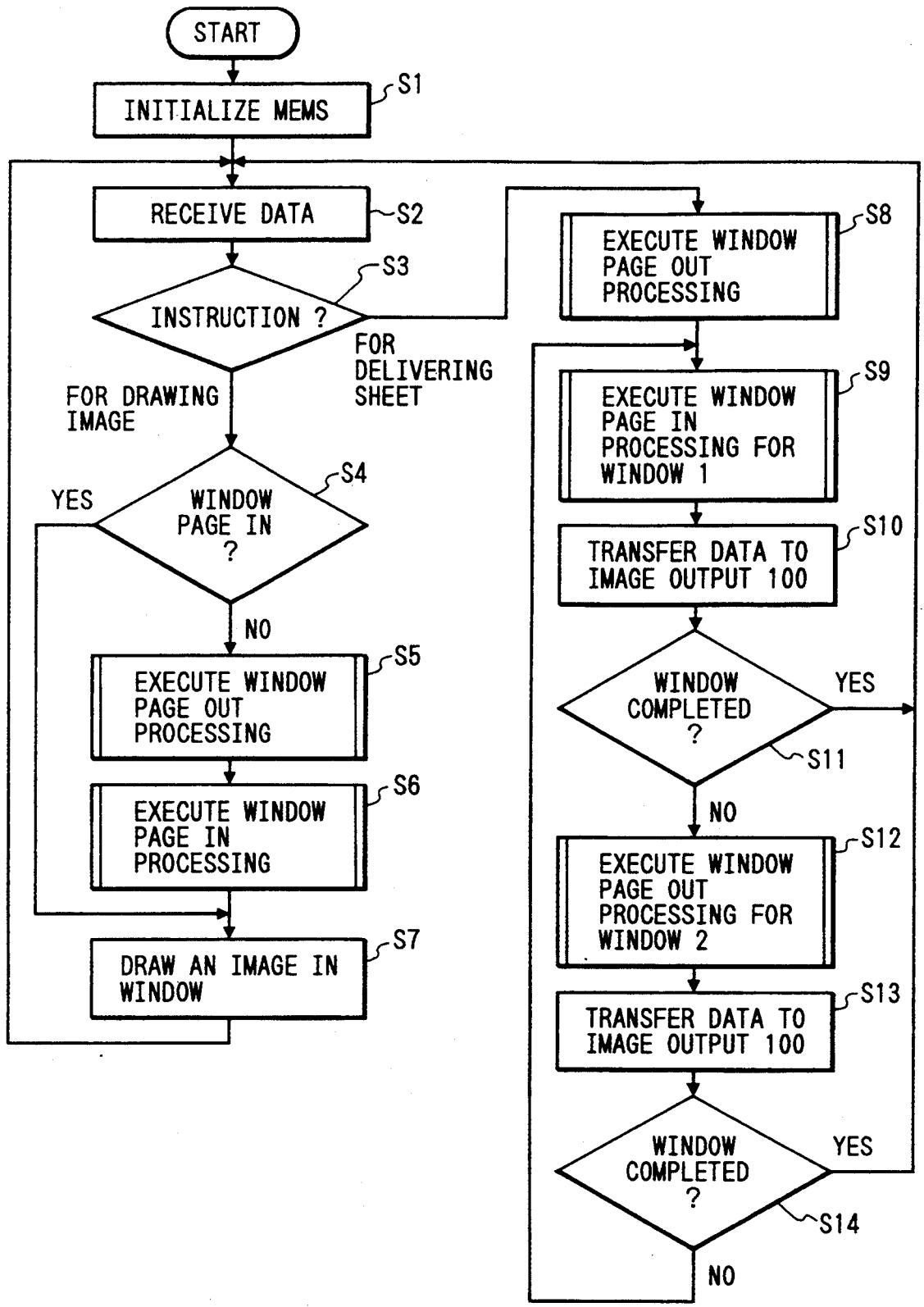
FIG. 6 is a flow chart showing printing processing.

(1) Overall Processing Flow (FIG. 6)

In step S1, when a power supply voltage is supplied to the LBP 100 through a power supply (not shown), the printing controller 1 also starts its operation, and initializes the window management table 12a, the reduced window memory 12d, the difference data management table 12e, and the like. In step S2, data is received from the host computer 2, and is stored in the input buffer 4. Thereafter, data for one window is read out.

In step S3, it is checked if the input data is an image drawing instruction or a sheet delivery instruction. If it is determined that the input data is an image drawing instruction, the flow advances to step S4. In step S4, it is checked if a window at the image drawing position is set in a page-in state. More specifically, the MMU 11 checks whether or not the address of the corresponding window in the window management table 12a is "NULL". If it is determined that the corresponding window is not set in a page-in state, the flow advances to step S5, and window page-out out processing shown in the flow chart of FIG. 7 is executed. Thus, a window, which is currently set in a page-in state, is set in a page-out state. The flow then advances to step S6, and page-in processing shown in the flow chart of FIG. 8 is executed. A new window (in this case, a window on which an image is to be drawn based on input data) is set in a page-in state. Note that the processing operations in steps S5 and S6 will be described in detail later. However, if it is determined in step S4 that the corresponding window is set in a page-in state, the flow advances to step S7.

In step S7, an image is drawn on the window set in the page in state according to the image drawing instruction. Upon completion of the processing in step S7, the flow returns to step S2, and the processing operations in steps S2 to S7 are repeated until data for one page of a recording sheet are received and the image drawing operation for the window is completed.

In this manner, the reduced window memory 12d stores reduced data of image data for one page of a recording sheet, and the compressed difference data memory 12f stores difference data (to be described later) for one page of a recording sheet. The reduced data is reduced to $\frac{1}{2}$ in terms of the resolution, and to $\frac{1}{4}$ in terms of the total number of pixels with respect to original image data.

Figure 7:
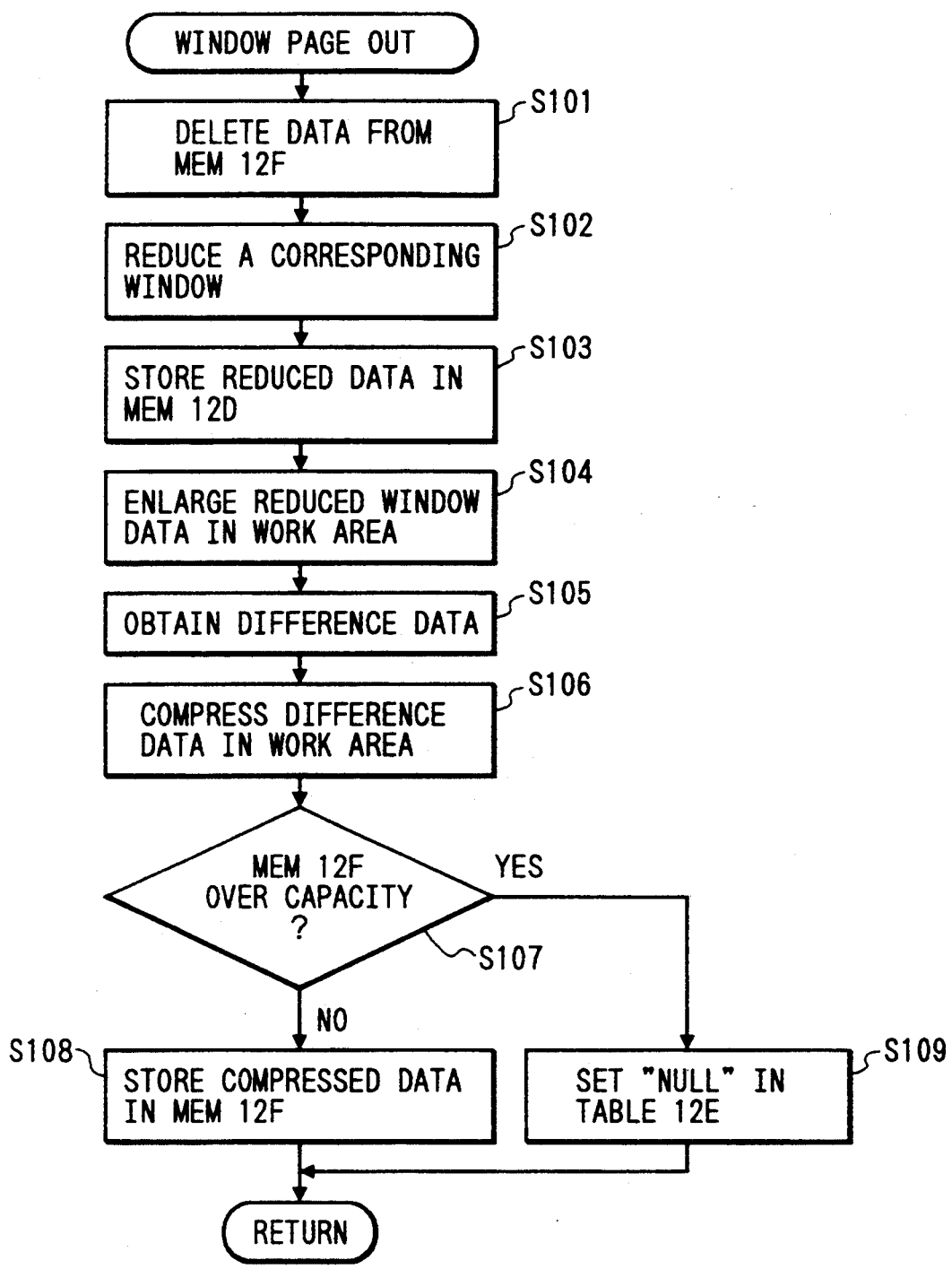
FIG. 7 is a flow chart showing window page out processing.

If it is determined in step S3 that the input data is a sheet delivery instruction, the flow advances to step S8, and the window page-out processing shown in the flow chart of FIG. 7 is executed to set all the windows, which are currently set in a page in state, in a page out state. Thus, data reduction and acquisition of compressed difference data associated with last data are completed, and image output data from the LBP 100 are prepared.

Figure 8:
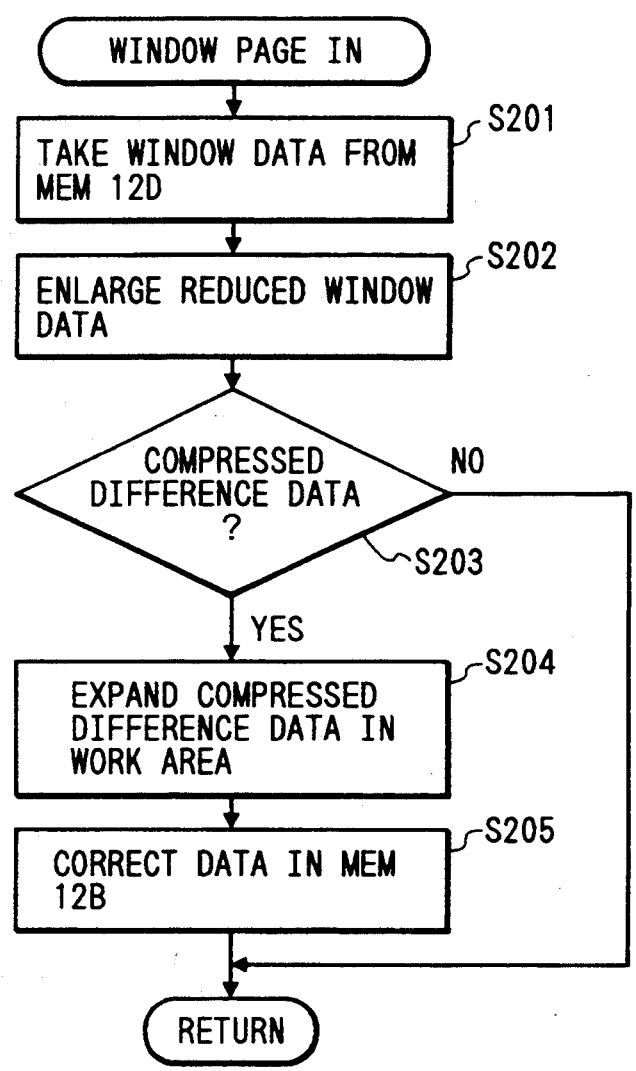
FIG. 8 is a flow chart showing window page in processing.

In step S9, the window page-in processing shown in the flow chart of FIG. 8 is executed. An image in the first window in the window area in the virtual storage is developed onto a window 1 area of the window memory 12b. In step S10, after it is confirmed that there is no data transfer output from a window 2 area to the LBP 100, or a data transfer output is completed, image data in the window 1 area in the window memory 12b is transferred to the image output unit 10.

After data transfer from the image output unit 10 to the LBP 100 is started, it is checked in step S11 if data transfer for all the windows is ended. If NO in step S11, the flow advances to step S12 to execute the window page-in processing shown in the flow chart of FIG. 8. In this processing, an image in the next window is developed onto the window 2 area of the window memory 12b. However, if it is determined in step S11 that the data transfer is ended, the flow returns to step S2.

In step S13, after it is confirmed that a data transfer output to the LBP 100 in step S10 is completed, image data in the window 2 area of the window memory 12b is transferred to the LBP 100 through the image output unit 10 as in step S10. After data transfer from the image output unit 10 to the LBP 100 is started, it is checked in step S14 if data transfer for all the windows is ended. If NO in step S14, the flow returns to step S9 to execute the window page in processing shown in the flow chart of FIG. 8. In step S9, an image in the next window is developed onto the window 1 area of the window memory 12b. Steps S10 to S14 are repeated until processing for all the windows is completed. If it is determined in step S14 that processing for all the windows is completed, the flow returns to step S2 to receive data.

(2) Window Page Out Processing (FIG. 7)

In step S101, difference data stored in the compressed difference data memory 12f is deleted through the difference management table 12e. However, no processing is executed if there is no difference data corresponding to a window to be stored. In step S102, data in a corresponding window area (window 1 or 2 area) of the window memory 12b is reduced by the image reduction circuit 6. In step S103, reduced data is stored at a corresponding window position in the reduced window memory 12d. In step S104, the reduced window data is enlarged on the work memory 12c by the image enlargement circuit 7.

In step S105, the enlarged data and the corresponding window data (window 1 or 2 data) in the window memory 12b are XORed, and the XORed result (to be referred to as difference data hereinafter) is written in the corresponding window area of the window memory 12b. In step S106, the difference data is compressed by the image compression circuit 8, and is developed onto the work memory 12c.

In step S107, the difference management table 12e is searched to obtain a total remaining capacity of the compressed difference data memory 12f, and the total remaining capacity is compared with the size of the compressed difference data on the work memory 12c. If the size of the compressed difference data on the work memory 12c is smaller than the remaining capacity, the compressed difference data is stored in the compressed difference data memory 12f through the difference management table 12e. In the difference management table 12e, the storage address of the compressed difference data is set. In contrast to this, if the size of the compressed difference data is larger than the remaining capacity, "NULL" is set at the corresponding position of the difference management table 12e.

(3) Window Page In Processing (FIG. 8)

In step S201, reduced window data corresponding to a window to be set in a page in state is acquired from the reduced window memory 12d. In step S202, the reduced window data is enlarged by the image enlargement circuit 7, and is developed on the corresponding window area of the window memory 12b. In step S203, the difference management table 12e is searched to check if there is difference data corresponding to the window to be set in a page in state. If there is corresponding difference data, the flow advances to step S204, and the compressed difference data is expanded in the image expansion circuit 9. The restored difference data is developed on the work memory 12c. Furthermore, in step S205, the restored difference data on the work memory 12c and the enlarged data in the window memory 12b are XORed to correct the enlarged data in the window memory 12b. In contrast to this, if there is no corresponding difference data, processing is ended without performing data correction.

The above-mentioned processing can be applied to actual printing processing as follows. For example, in a conventional monochrome binary printer having a print resolution of 600 dpi, when an image is output onto an A4-size (297 mm×210 mm) recording sheet, a memory of about 4 MB (to be referred to as a full bit map hereinafter) is required to bit-map develop an image for one page of a recording sheet at a time.

However, when the printing processing according to this embodiment is executed, for example, if the window size is set to be 1/10 the full bit map size, the memory size requires a total of 2.4 MB, i.e., 0.4 MB×2 for the window size, 0.4 MB for the work memory, 1 MB for the reduced window memory (the total number of pixels is reduced to ¼ in this embodiment), and 0.2 MB for the management table, the difference memory, and the like. Thus, printing processing equivalent to a full bit map function can be realized by a memory size of about 60% that of the conventional apparatus. According to this embodiment, the two window areas of the window memory 12b are alternately used as an output buffer to the LBP 100, and even when data transfer from one window area to the LBP 100 is not completed, an output image can be output to the other window area. Therefore, data transfer to the LBP 100 can be continuously executed, and high-speed image output processing can be realized.

Note that the above-mentioned numerical values are merely examples, and may be desirably changed in correspondence with the characteristics, performance, cost, and the like of apparatuses which may adopt the present invention.

In this embodiment, the reduced window memory 12d and the compressed difference data memory 12f are managed independently of each other, but may be simultaneously managed. In this case, when the reduced window memory becomes short, certain compressed difference data may be deleted to empty an area, so that the reduced window memory can always be assured.

In this embodiment, a laser beam printer is used as an image processing apparatus. However, the present invention is not limited to this. For example, other printing output apparatuses such as an ink-jet printer, a wire-dot printer, an LED printer, a liquid crystal shutter printer, and the like may be used.

In this embodiment, an MMR method is used as an image compression/expansion method. However, the present invention is not limited to this. For example, other methods such as Huffman, run-length, MH, MR, pack bits method, and the like may be used. In this case, a reversible compression method having high compression efficiency is preferable.

In this embodiment, a ½ averaging reduction method is used as a reduction method. However, the present invention is not limited to this, but may use other reduction methods. In this case, a reduction method, which has a large reduction ratio, and can restore an image by reduction/enlargement to have the least difference from an original image is preferable. Similarly, a ×2 weighted mean interpolation method is used as an enlargement method. However, the present invention is not limited to this, but may use other enlargement methods as long as the enlargement ratio is the same as the reduction ratio. In this case, as with the reduction method, an enlargement method, which can restore an image by reduction/enlargement to have the least difference from an original image is preferable. Smoothing processing, filtering processing for, e.g., an edge, and the like may be properly added before and after reduction/enlargement.

Furthermore, in this embodiment, compression/expansion processing and reduction/enlargement processing are executed by special-purpose circuits. However, the present invention is not limited to this. Some or all of the compression/expansion processing and reduction/enlargement processing may be executed by software. In this embodiment, memory management of the RAM 12 is performed by a virtual addressing method using the MMU 11. However, the present invention is not limited to this. For example, the memory management may be entirely executed by software without using the MMU 11.

The present invention may be applied to either a system constituted by a plurality of devices or an apparatus consisting of a single device. The present invention may be applied to a case wherein a program is supplied to a system or apparatus to attain the system or apparatus.

As described above, according to the present invention, input data is stored in the form of reduced image data and compressed difference data, and original data is restored from these data and output. Therefore, a large amount of image data can be output without causing image quality deterioration although a small-capacity storage means is used. Furthermore, when an image is output, a plurality of buffer means are used. Therefore, image data is output from one buffer, while restored image data can be output to the other buffer, thus increasing the image output speed.

The compressed difference data is obtained by compressing difference data between data obtained by enlarging reduced image data and original image data. Therefore, since the entropy of data itself is lowered, compression efficiency can be improved.

As described in detail above, the present invention can provide an image processing method or apparatus, wherein image data is reduced, the difference between original image data and image data enlarged after reduction is obtained, the difference data is compressed, and image data can be restored on the basis of data obtained by enlarging reduced image data and expanding compressed difference data.

What is claimed is:

1. An output apparatus for generating and outputting information, comprising:

size changing means for reducing data and storing the reduced data, and for enlarging the stored data;

compression means for obtaining difference data which represent the difference between the data prior to reduction and the enlarged data, and for compressing the difference data;

determination means for determining whether the compressed difference data can be stored in a memory; and means for deleting the difference data and generating output information based on the enlarged data in the event that said determination means determines that the compressed difference data cannot be stored in the memory, and for generating output information based on the difference data as expanded and the enlarged data in the event that said determination means determines that the compressed difference data can be stored in the memory.

2. An output apparatus according to claim 1, further comprising means for determining whether the compressed difference data are stored in the memory and wherein, if it is determined that the compressed difference data are stored in the memory, said output information generating means expands the stored difference data.

3. An output apparatus according to claim 1, wherein, in the event that the difference data as expanded are stored in the memory, said output information generating means corrects the enlarged data by executing an exclusive OR operation between the difference data as expanded and the enlarged data, and generates the information to be output.

4. An output apparatus according to claim 1, wherein, in the event that the difference data as expanded are not stored in the memory, said output information generating means generates the information to be output without correcting the enlarged data.

5. An output method of generating and outputting information, comprising the steps of:

reducing data, storing the reduced data, and enlarging the stored data;

obtaining difference data which represent the difference between the data prior to reduction and the enlarged data, and compressing the difference data;

determining whether the compressed difference data can be stored in a memory; and deleting the difference data and generating output information based on the enlarged data in the event of a determination in said determination step that the compressed difference data cannot be stored in the memory, and generating output information base on the difference data as expanded and the enlarged data in the event of a determination in said determination step that the compressed difference data can be stored in the memory.

6. A method according to claim 5, wherein, in said deleting and generating step, a determination is made as to whether the compressed difference data are stored in the memory and, if it is determined that the compressed difference data are stored in the memory, the stored difference data are expanded.

7. A method according to claim 5, wherein, in the event that the difference data as expanded are stored in the memory, said deleting and generating step includes correcting the enlarged data by executing an exclusive OR operation between the difference data as expanded and the enlarged data, and generating the information to be output.

8. A method according to claim 5, wherein, in the event that the difference data as expanded are not stored in the memory, said deleting and generating step includes generating the information to be output without correcting the enlarged data.

* * * * *

UNITED STATES PATENT AND TRADEMARK OFFICE
CERTIFICATE OF CORRECTION

PATENT NO. : 5,432,891
DATED : July 11, 1995
INVENTOR(S) : KEN ONODERA

It is certified that error appears in the above-identified patent and that said Letters Patent is hereby corrected as shown below:

ON TITLE PAGE,

In [56] References Cited, under U.S. PATENT DOCUMENTS:
"Bochtle" should read --Bechtle--.

COLUMN 5

Line 34, "pixel," should read --pixel--.
Line 55, "RAM 120" should read --RAM 12.--.

COLUMN 12

Line 1, "base" should read --based--.

Signed and Sealed this

Twelfth Day of December, 1995

Attest:

BRUCE LEHMAN

Attesting Officer

Commissioner of Patents and Trademarks